Feb. 27, 1945. R. H. DIXON 2,370,452
FASTENER DEVICE
Filed Sept. 16, 1943
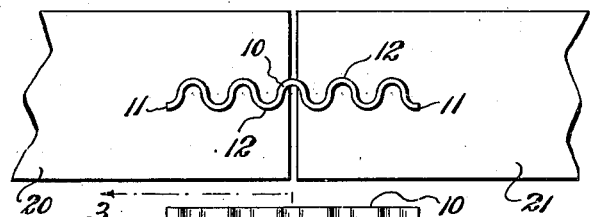
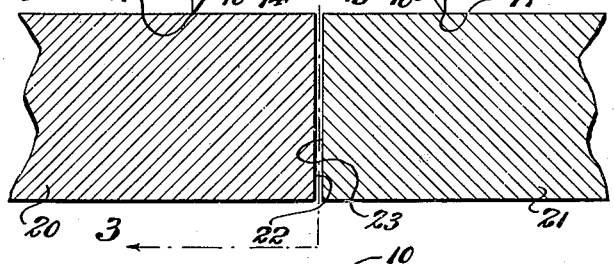
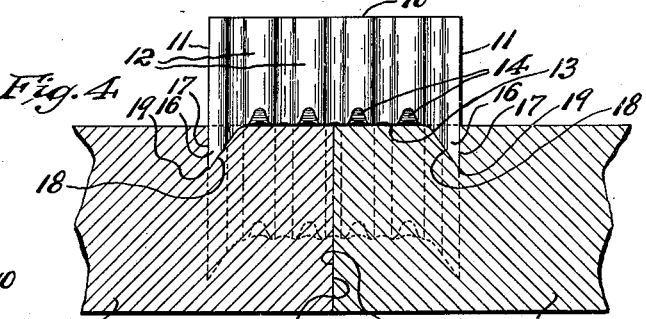
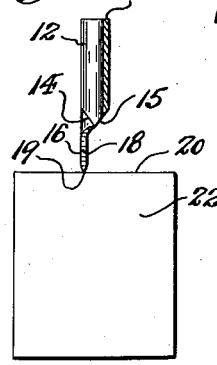
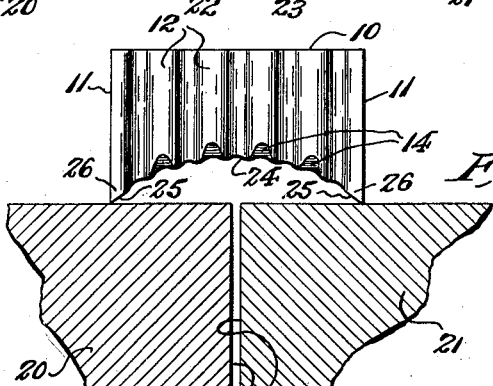
INVENTOR.
Ralph H. Dixon,
BY George D. Richards
ATTORNEY.

Patented Feb. 27, 1945

2,370,452

UNITED STATES PATENT OFFICE 2,370,452

FASTENER DEVICE

Ralph Hilliard Dixon, Belleville, N. J.

Application September 16, 1943, Serial No. 502,654

4 Claims. (Cl. 85—11)

This invention relates to improvements in fastener devices; and the invention has reference, more particularly, to a novel combination corrugated nail and pinch dog for securing and tying together, in tight fitting relation, abutting parts of various kinds of wooden or like structural assemblies, such e. g. as box structures, frame structures, and various other kinds of butt joint structures.

The invention has for an object to provide a novel construction of combination corrugated nail and pinch dog, so devised that, when driven into a butt joint structure, in bridging relation to the members thereof, its initial entering movement will cause the adjoining members to be drawn together in tight fitting abutted relation, whereafter, when driven home into the material of said members, the corrugated body of the device will interlock with said material to provide a secure tying together of said members against separation thereof from their attained tight fitting abutted relation.

The invention has for a further object to provide a combination corrugated nail and pinch dog fastener comprising a substantially rectangular corrugate body, the corrugations of which extend substantially perpendicularly between top and bottom edges thereof, terminal portions of said bottom edge being formed to provide cuneate pinch dog portions at each end of said body which freely project beyond and so as to lie wholly below the plane of the entrant edge of the body portion intermediate thereof.

Illustrative embodiments of this invention are shown in the accompanying drawing, in which:

Fig. 1 is a plan view of a butt joint structure showing the combination corrugated nail and pinch dog as applied thereto ready to be driven home therein; Fig. 2 is a face elevation of the corrugated nail and pinch dog as thus applied to a butt joint structure, the latter being shown in section; Fig. 3 is a cross sectional view, taken on line 3—3 in Fig. 2; and Fig. 4 is a view similar to that of Fig. 2, but showing, in full lines, the corrugated nail and pinch dog as initially entered into the material of the butt joint structure to draw the members thereof into tight fitting abutting relation, and further showing, in dotted outline, the position of said corrugated nail and pinch dog as finally driven home into said members so as to tie the same together against separation.

Fig. 5 is a view similar to that of Fig. 2, but showing a somewhat modified form of the corrugated nail and pinch dog.

Similar characters of reference are employed in the above described views, to indicate corresponding parts.

The novel combination corrugated nail and pinch dog fastener according to this invention, in the form thereof shown in Figs. 1 to 4 inclusive, comprises a substantially rectangular body of suitable length and height or width, said body having a straight top edge 10 and straight side or end edges 11 which are substantialy perpendicular to said top edge. Said body is made of sheet metal formed to provide the same with a series of perpendicular corrugations 12, i. e. corrugations disposed substantially parallel to its side or end edges 11 and spaced therebetween. The major portion of the corrugated body is provided with a straight bottom or entrant edge 13, and preferably, although not essentially, the ends of the oppositely projecting corrugations terminating at said bottom or entrant edge 13 are chamfered, as at 14 and 15 (see Fig. 3 more particularly), toward the medial line of said bottom edge, whereby to provide a sharpened bottom edge portion to facilitate entrance of the body into material of the structural parts desired to be joined thereby, when said body is driven thereinto.

Formed integrally respectively with the respective side or end portions of the body, to project downwardly therefrom beyond and so as to lie wholly below its bottom or entrant edge 13, are pinch dog portions 16 which are of cuneate form, being bounded by convergent external and internal side edges 17 and 18. Said external side edges 17 are preferably respectively aligned with and so as to form continuate portions of the respective side or end edges 11 of the body, whereas said internal side edges 18 are respectively obliquely inclined, downwardly and outwardly, from the body bottom or entrant edge 13, so as to terminate in sharpened points 19 formed by the converging intersection thereof with the adjacent external side edges 17.

In the use of the combination corrugated nail and pinch dog fastener device for tying and securing together abutting members, as 20 and 21, of a joint structure, its body is applied perpendicular to and with its bottom or entrant edge 13 and pinch dog portions 16 opposed to surfaces of said members so as to straddle the opposed meeting faces 22 and 23 of said members (see Figs. 1 and 2). Being thus disposed, the top edge 10 of the body is struck by a suitable driving implement, such e. g. as a hammer, whereby to initially drive the body downward, and thus cause the pinch dog portions 16 to first respectively and wholly penetrate the material of said members 20 and 21 before the entrant edge 13 starts to enter the same. By reason of their cuneate form, the pinch dog portions 16, as they respectively penetrate the material of the respective members 20 and 21 before the main body of the device enters the latter, function to force said members together, so that their opposed meeting faces 22 and 23 are first brought into tight meeting relation (see full line representation in Fig. 4). The wedging effect of the respective pinch dog portions 16, whereby the members of the joint structure are forced firmly and tightly into mutual abutment, is produced by the oblique internal edges 18 of said pinch dog portions, which, as they traverse the material of the members contacted thereby, exert a lateral inward thrust upon the members, operative to shift and crowd the same one toward the other. After the members 20 and 21 are thus initially moved into tight mutual abutment, continued inward driving of the fastener device causes the corrugated body thereof to penetrate the material of the members 20 and 21 until the top edge 10 of said body lies flush with outer face surfaces of said members (see dotted line representation in Fig. 4). Due to the sinuosity of the corrugations 12, the same, when entered in the material of the members 20 and 21, interlock with the mass thereof, so as to strongly resist any separative movement of the members, whereby the latter are firmly secured and tied together in tight abutment.

A somewhat modified form of the novel combination corrugated nail and pinch dog fastener device is shown in Fig. 5, wherein, instead of providing the body with a straight bottom edge, the same is provided with an arcuate bottom or entrant edge 24; the terminal portions 25 of which downwardly and outwardly incline toward and intersectingly converge upon the side or end edges 11 of the fastener body, thus providing cuneate pinch dog portions 26, which project from and lie wholly below said bottom or entrant edge 24, being therefore substantially similar in form and exactly the same in functional effect to the pinch dog portions 16 of the first above described construction.

From the above description, it will be obvious that a novel fastener device is provided which combines, in a single unitary construction, the functional advantages of pinch dog means with those of a corrugated nail for tying and securing together the members of a joint structure in tight abutment.

Having now described my invention, I claim:

1. A fastener device of the kind described comprising a corrugate sheet metal body having a straight top edge, a bottom entrant edge substantially parallel thereto and end edges perpendicular to said top and bottom edges; the corrugations of said body extending from said top edge to said bottom entrant edge substantially parallel to the perpendicular end edges, and said body being provided with cuneate pinch dog portions at each end thereof disposed to freely project downwardly beyond and so as to lie wholly below the plane of said bottom entrant edge of said body.

2. A fastener device of the kind described comprising a corrugate sheet metal body having a straight top edge, a bottom entrant edge substantially parallel thereto and end edges perpendicular to said top and bottom edges; the corrugations of said body extending from said top edge to said bottom entrant edge substantially parallel to the perpendicular end edges, said body being provided with cuneate pinch dog portions at each end thereof disposed to freely project downwardly beyond and so as to lie wholly below the plane of said bottom entrant edge of said body, the external edges of said pinch dog portions constituting aligned continuate extensions of the perpendicular end edges of said body, and the internal edges of said pinch dog portions being downwardly and outwardly inclined to converge toward said external edges in acute angular relation thereto.

3. A fastener device of the kind described comprising a corrugate sheet metal body having a straight top edge, a concavely arcuate bottom entrant edge and end edges perpendicular to said top edge; the corrugations of said body extending from said top edge to said bottom entrant edge substantially parallel to the perpendicular end edges, and said body being provided with cuneate pinch dog portions at each end thereof disposed to freely project downwardly beyond and so as to lie wholly below said bottom entrant edge of said body.

4. A fastener device of the kind described comprising a corrugate sheet metal body having a straight top edge, a concavely arcuate bottom entrant edge and end edges perpendicular to said top edge; the corrugations of said body extending from said top edge to said bottom entrant edge substantially parallel to the perpendicular end edges, and said body being provided with cuneate pinch dog portions at each end thereof disposed to freely project downwardly beyond and so as to lie wholly below said bottom entrant edge of said body, the external edges of said pinch dog portions constituting aligned continuate extensions of the perpendicular end edges of said body, and the internal edges of said pinch dog portions being downwardly and outwardly inclined to converge toward said external edges in acute angular relation thereto.

RALPH HILLIARD DIXON.